United States Patent

Hsieh

(10) Patent No.: US 9,683,351 B2
(45) Date of Patent: Jun. 20, 2017

(54) OPENING FOR METAL FAUCET

(71) Applicant: Chin-Ming Hsieh, Chang-Hua Hsien (TW)

(72) Inventor: Chin-Ming Hsieh, Chang-Hua Hsien (TW)

( * ) Notice: Subject to any disclaimer, the term of this patent is extended or adjusted under 35 U.S.C. 154(b) by 177 days.

(21) Appl. No.: 13/922,103

(22) Filed: Jun. 19, 2013

(65) Prior Publication Data

US 2014/0373270 A1 Dec. 25, 2014

(51) Int. Cl.
*E03C 1/04* (2006.01)
*F16L 19/02* (2006.01)
*F16L 19/028* (2006.01)
*B21D 41/00* (2006.01)

(52) U.S. Cl.
CPC .......... *E03C 1/0404* (2013.01); *F16L 19/028* (2013.01); *F16L 19/0237* (2013.01); *B21D 41/00* (2013.01)

(58) Field of Classification Search
CPC ........ E03C 1/04; E03C 1/0404; E03C 1/0408; E03C 1/02; E03C 1/021; E03C 1/025; E03C 2001/0415; E03C 2001/0416; E03C 1/0403; E03C 2001/028; E03C 1/12; F16L 15/08; F16L 15/006; F16L 15/008; F16L 19/028; F16L 19/0212; F16L 19/0218; F16L 19/0237; F16L 19/0286; F16L 19/02; F16L 19/025; B21D 41/00; B21D 41/025; B21D 41/02; B21D 41/04
USPC ..... 4/678, 675, 695, 696; 137/801; 138/177, 138/178, DIG. 11; 29/890.14, 890.141, 29/890.142, DIG. 43; 72/370.1, 370.03, 72/370.14, 370.02, 370.11, 370.13
See application file for complete search history.

(56) References Cited

U.S. PATENT DOCUMENTS

| | | | | |
|---|---|---|---|---|
| 2,366,444 | A * | 1/1945 | Dorman | F16L 19/028 285/179 |
| 3,723,043 | A * | 3/1973 | Leopold | F16L 19/04 29/523 |
| 4,516,278 | A * | 5/1985 | Lamond | E03C 1/284 137/247.41 |
| 4,598,937 | A * | 7/1986 | Sugao | F16L 58/184 285/334.5 |
| 4,893,657 | A * | 1/1990 | Usui | F16L 19/028 138/109 |
| 5,291,622 | A * | 3/1994 | Humpert | 4/678 |
| 5,364,135 | A * | 11/1994 | Anderson | 285/38 |
| 6,327,771 | B1 * | 12/2001 | Anglin | F16L 19/0225 29/523 |
| 2005/0067602 | A1 * | 3/2005 | Schutz | B67D 3/04 251/305 |
| 2008/0121293 | A1 * | 5/2008 | Leber et al. | 137/597 |
| 2009/0224537 | A1 * | 9/2009 | Pliassounov | B60T 17/04 285/331 |
| 2013/0019975 | A1 * | 1/2013 | Chen | 137/801 |
| 2014/0083539 | A1 * | 3/2014 | Ho et al. | 137/625.4 |
| 2014/0096318 | A1 * | 4/2014 | Chen et al. | 4/678 |

* cited by examiner

*Primary Examiner* — J. Casimer Jacyna

(74) *Attorney, Agent, or Firm* — Che-Yang Chen; Law Offices of Scott Warmuth

(57) ABSTRACT

An improved opening for a metal faucet has an outlet neck having an opening with an outer threaded section at an outer edge and a curved stopping ring at the opening, the stopping ring having a rounded surface at an inner edge. The improved opening for a metal faucet which does not have any sharp edge and provide smooth water flows.

1 Claim, 6 Drawing Sheets

9,683,351 B2

OPENING FOR METAL FAUCET

BACKGROUND OF THE INVENTION

1. Field of the Invention

The present invention relates to an improved opening for a metal faucet, and more particularly to an improved opening for a metal faucet which does not have any sharp edge and provide smooth water flows.

2. Description of the Related Art

Currently, as shown in FIG. 6, a typical metal faucet has an outlet neck 50 with an opening 51 and an outer threaded section 52 which is engaged with a securing nut 53 to be connected to an external pipe 54. A sealing ring 55 is disposed adjacent to the opening 51 of the outlet neck 50 and between the opening 51 and the external pipe 54. However, the opening 51 of the outlet neck 50 has a small contact area against the sealing ring 55, the sealing ring 55 tends to escape away from the engagement and have the leakage problem. Furthermore, when the outer threaded section 52 of the outlet neck 50 is engaged with the securing nut 53, the corresponding torque might cause the opening 51 to crack which results the increase of the thickness of the outlet neck 50.

Moreover, another typical outlet neck, as shown in FIGS. 7 and 8, the outlet neck 50 has an opening 51 with an inner ring 56 which can prevent the disengagement and the leakage. However, the inner ring 56 might block the water flow and cause water splash. Furthermore, when the outlet neck 50 is attached with a moderating plate 60, the moderating plate 60 is pushed into the outlet neck 50 through the inner ring 56, and the inner ring 56 becomes an obstacle to the moderating plate 60.

Therefore, it is desirable to provide an improved opening for a metal faucet to mitigate and/or obviate the aforementioned problems.

SUMMARY OF THE INVENTION

An objective of the present invention is to provide an improved opening for a metal faucet.

In order to achieve the above mentioned objective, an improved opening for a metal faucet comprises: an outlet neck having an opening with an outer threaded section at an outer edge and a curved stopping ring at the opening, the stopping ring having a rounded surface at an inner edge.

Furthermore, the outlet neck is engaged with a locking member at the outer threaded section, and another end of the locking member has a limiting ring for being connected to an external pipe.

Furthermore, the outlet neck further has a sealing ring disposed on to an outer end of the stopping ring, and another end of the sealing ring makes contact with the external pipe.

Furthermore, the outlet neck further has a moderating plate inside, the moderating plate has a limiting aperture, and the moderating plate is placed through the stopping ring into the outlet neck.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
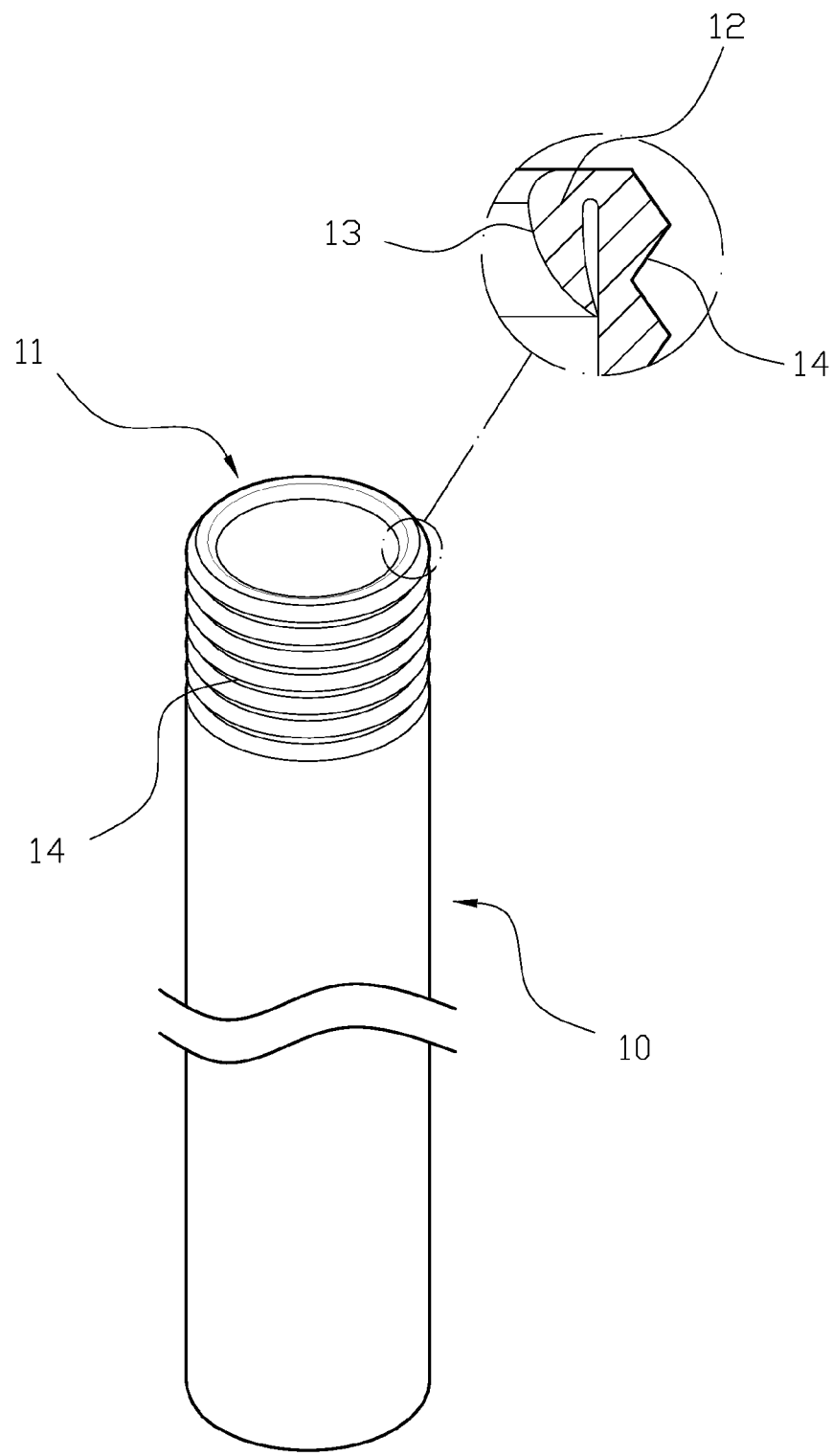
FIG. 1 is a perspective and local view of a preferred embodiment of the present invention.

Please refer to FIG. 1. A metal faucet comprises: an outlet neck 10, the outlet neck 10 has an opening 11 with an outer threaded section 14 at an outer edge and a curved stopping ring 12 at the opening 11, and the stopping ring 12 has a rounded surface 13 at an inner edge. The outlet neck 10 can be attached onto an inlet end and an outlet end of a water pipe system. The stopping ring 12 increase the structure strength of the opening 11, and the rounded surface 13 helps to smooth the water flow without splashing.

Figure 2:
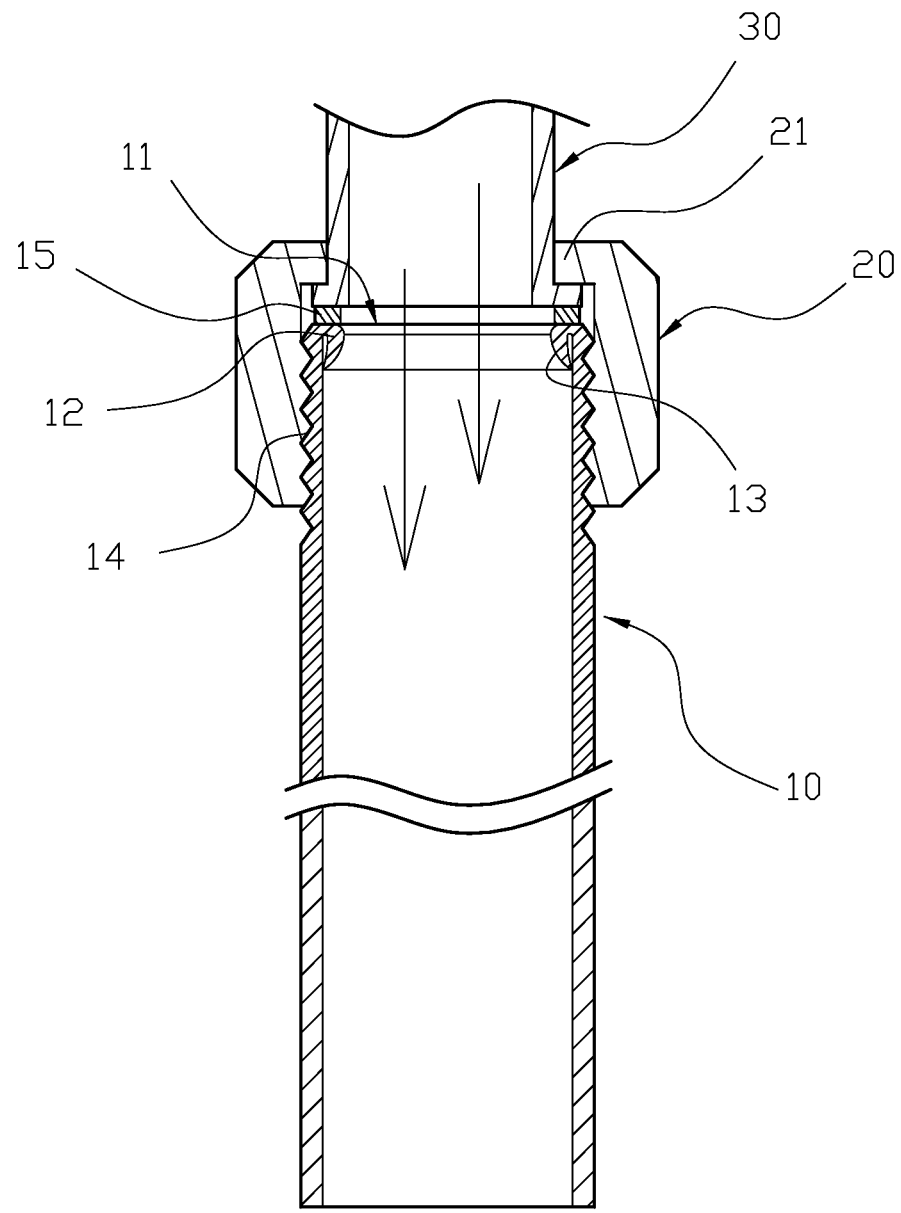
FIG. 2 is a schematic drawing showing a usage status of the preferred embodiment of the present invention.

Please refer to FIG. 1 and FIG. 2 together. The stopping ring 12 of the outlet neck 10 is attached onto the inlet end of water pipe system. Then the water flows from the stopping ring 12 into the outlet neck and exits from another end of the outlet neck 10. A locking member 20 is engaged with the outer threaded section 14 of the outlet neck 10, and another end of the locking member 20 has a limiting ring 21 for being connected to an external pipe 30. Furthermore, the outlet neck further has a sealing ring 15 disposed on to an outer end of the stopping ring 12, and another end of the sealing ring 15 makes contact with the external pipe 30. Therefore, the outlet neck 10 utilizes the stopping ring 12 in the opening 11 to increase a contact area of the sealing ring 15 such that the sealing ring 15 is capable of being securely sandwiched between the stopping ring 12 and the external pipe 30 and free from escaping. Furthermore, the opening 11 of the outlet neck 10 has the bent stopping ring 12 which increases the thickness and structural strength of the opening 11, such that while the outer threaded section 14 of the outlet neck 10 and the locking member 20 are tightened, the opening 11 is free from cracking caused by torque.

Figure 3:
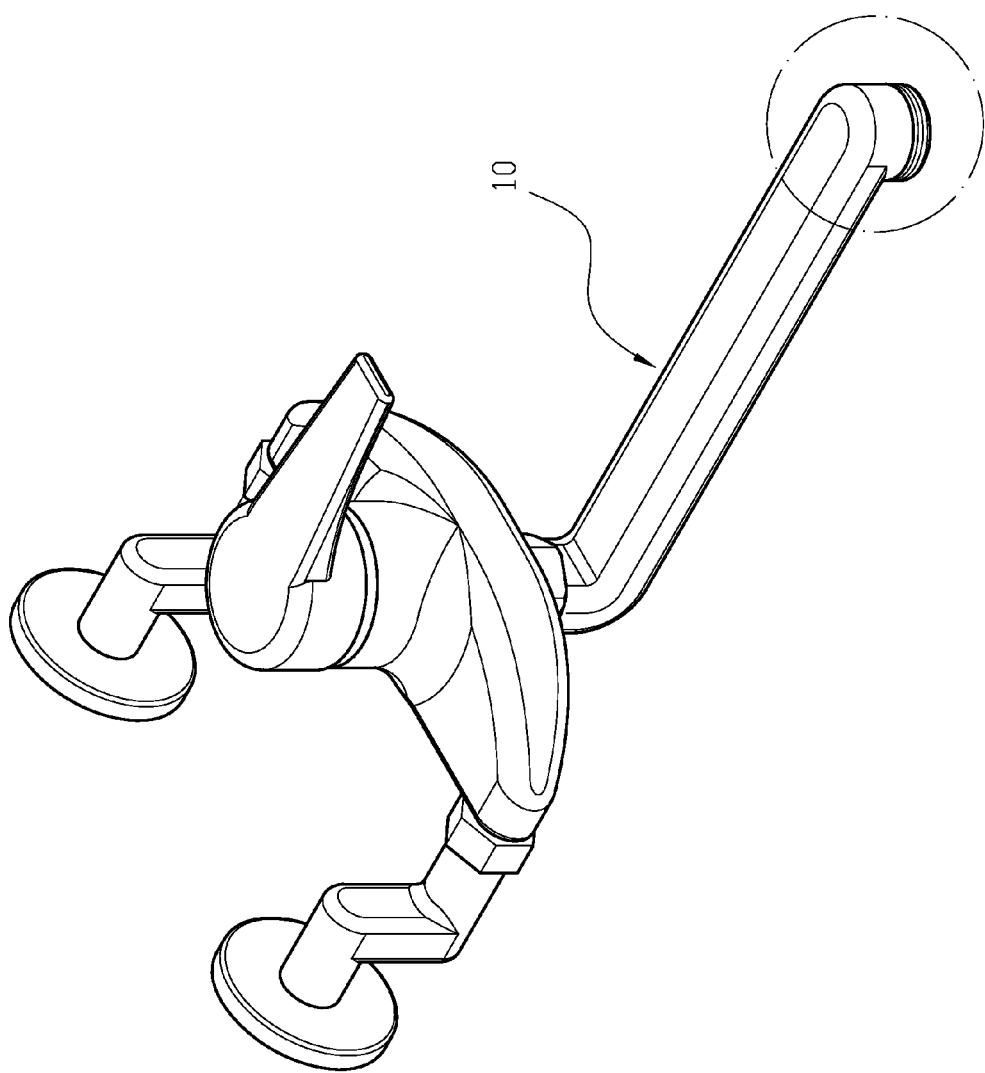
FIG. 3 is a schematic drawing showing another usage status of the preferred embodiment of the present invention.
Figure 4:
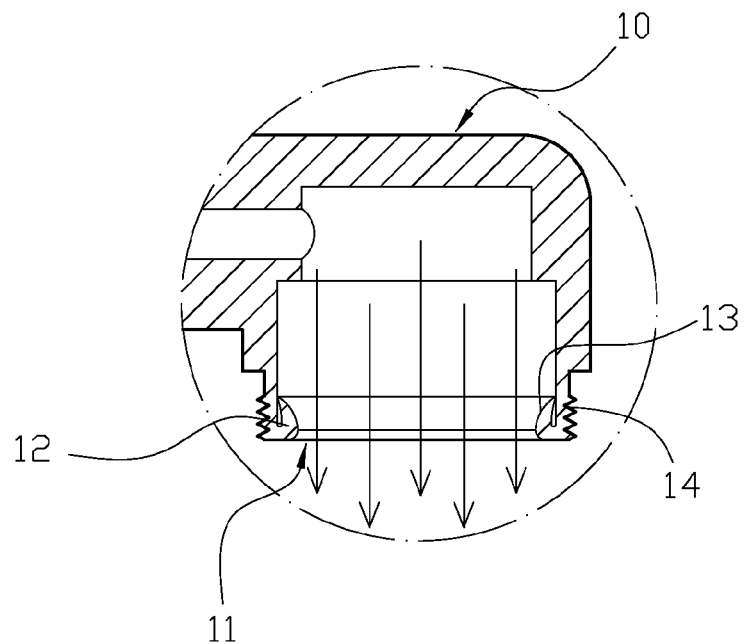
FIG. 4 is a cross-sectional drawing showing another usage status of the preferred embodiment of the present invention.
Figure 5:
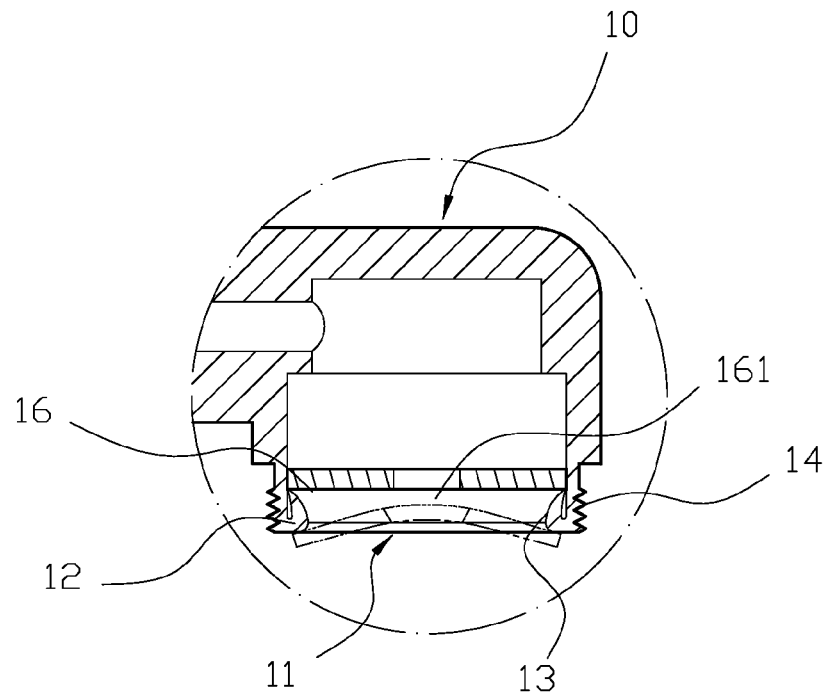
FIG. 5 is a schematic drawing showing another usage status of the preferred embodiment with a moderating plate of the present invention.
Figure 6:
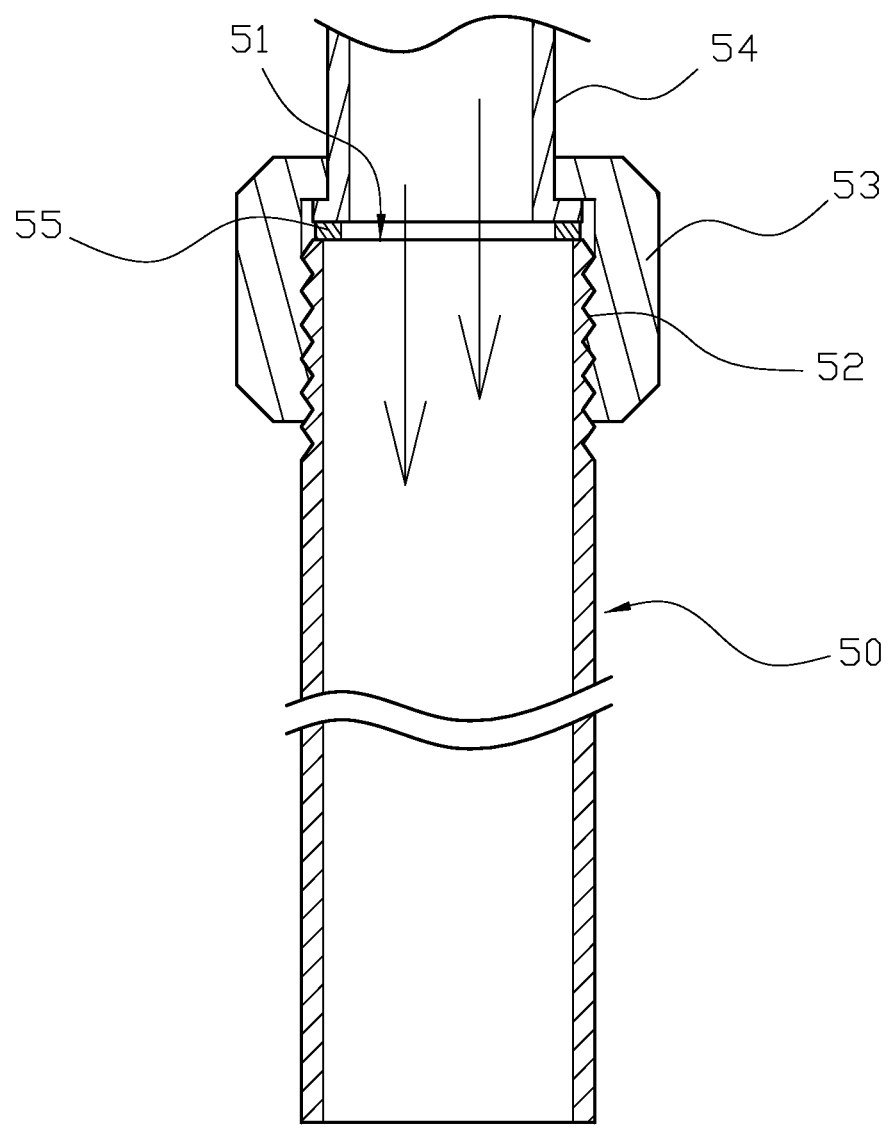
FIG. 6 is a schematic drawing showing a usage status of a prior art.
Figure 7:
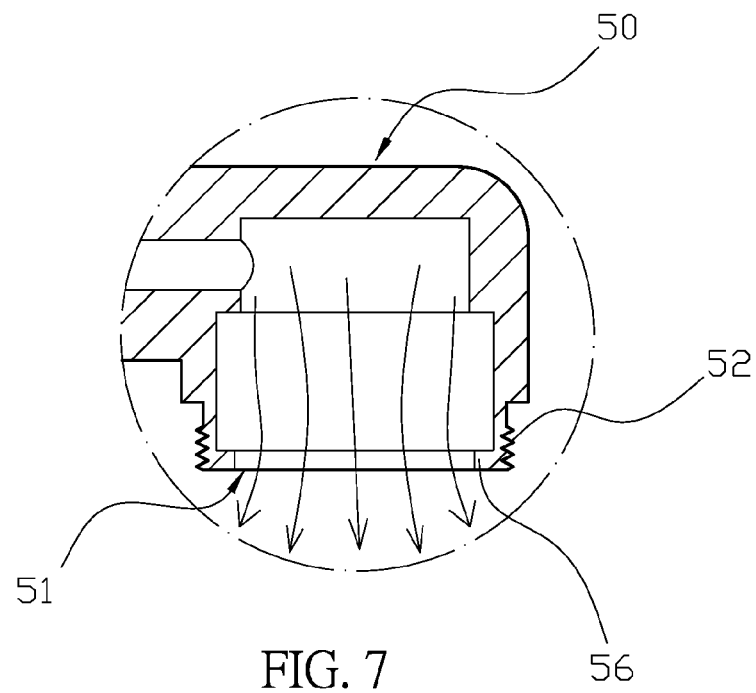
FIG. 7 is a schematic drawing showing another usage status of the prior art
Figure 8:
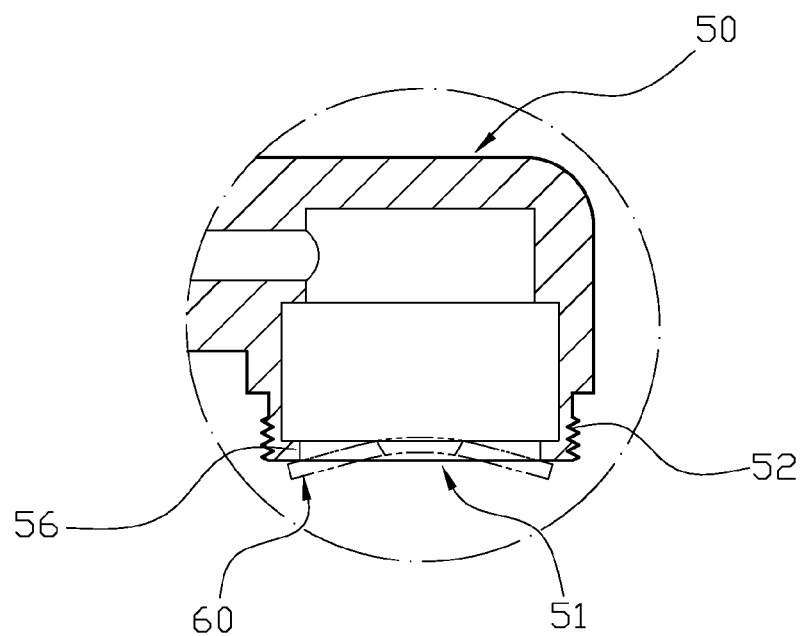
FIG. 8 is a schematic drawing showing another usage status of the prior art with a moderating plate.

Please refer to FIGS. 3, 4 and 5. For another usage status of the embodiment of the present invention, the outlet neck 10 has the curved stopping ring 12 at the opening 11, and the stopping ring 12 has the rounded surface 13 at an inner edge the opening 11. The stopping ring 12 of the outlet neck 10 is attached onto the outlet end of the external pipe. Then the water flows into the outlet neck 10 exits from the stopping ring 12. When the water passes through the stopping ring 12, the rounded surface 13 of the stopping ring 12 helps to smooth the water flow and reduce water splash. Moreover, the outlet neck 10 further has a moderating plate 16 inside, the moderating plate 16 has a limiting aperture 161, and the moderating plate 16 is placed through the stopping ring 12 into the outlet neck 10. The stopping ring 12 limits the moderating plate 16, and the limiting aperture 161 of the moderating plate 16 reduces the inner diameter of the outlet neck 10. In addition, since the stopping ring 12 of the outlet neck 10 has the rounded surface 13 which allows the flexible moderating plate 16 to be bent and placed through the stopping ring 12 and inside of the outlet neck 10. Furthermore, while installing the moderating plate 16 or any other time the rounded surface 13 can prevent the sharp edge of the stopping ring 12 from cutting the user.

Although the present invention has been explained in relation to its preferred embodiment, it is to be understood that many other possible modifications and variations can be made without departing from the spirit and scope of the invention as hereinafter claimed.

What is claimed is:

1. An opening for a metal faucet comprising an outlet neck having an opening with an outer threaded section at an outer edge and a curved stopping ring having a tapered end in contact with an inner surface of the outer threaded section, and an elongated gap is formed between an inner surface of the curved stopping ring and the inner portion of the opening, wherein the outlet neck is engaged with a locking member at the outer threaded section, and another end of the locking member has a limiting ring for being connected to an external pipe, wherein a sealing ring is disposed on to an outer end of the stopping ring, and another end of the sealing ring is in contact with the external pipe, and the stopping ring is configured to increase a contact area of the sealing ring such that the sealing ring is securely sandwiched between the stopping ring and the external pipe.

* * * * *